(12) United States Patent
Tzioumakis et al.

(10) Patent No.: US 9,675,096 B2
(45) Date of Patent: Jun. 13, 2017

(54) GREEN COLORING OF TABLE OLIVES WITH CHLOROPHYLL COMPOUNDS

(76) Inventors: Christos Tzioumakis, Itea Fokida (GR); Sotirios Tzioumakis, Itea Fokida (GR)

( * ) Notice: Subject to any disclaimer, the term of this patent is extended or adjusted under 35 U.S.C. 154(b) by 1101 days.

(21) Appl. No.: 13/505,130

(22) PCT Filed: Aug. 1, 2011

(86) PCT No.: PCT/GR2011/000030
§ 371 (c)(1),
(2), (4) Date: Jul. 13, 2012

(87) PCT Pub. No.: WO2012/020269
PCT Pub. Date: Feb. 16, 2012

(65) Prior Publication Data
US 2013/0129878 A1 May 23, 2013

(30) Foreign Application Priority Data

Aug. 11, 2010 (GR) .................................. 100100450

(51) Int. Cl.
*A23L 5/47* (2016.01)
*A23L 1/275* (2006.01)
*A23L 19/00* (2016.01)
*A23L 5/43* (2016.01)

(52) U.S. Cl.
CPC .............. *A23L 1/2751* (2013.01); *A23L 5/43* (2016.08); *A23L 5/47* (2016.08); *A23L 19/03* (2016.08); *A23L 19/05* (2016.08)

(58) Field of Classification Search
CPC ....................................... A23L 1/272

USPC .................................. 426/270, 540, 250, 262
See application file for complete search history.

(56) References Cited

PUBLICATIONS

Minguez-Mosquera et al. "Pigment Changes in Olives during Fermentation and Brine Storage", J. Agric. Food Chem. 1989, 37, p. 8-11.*

Beatriz Gandul-Rojas, Maria Roca, Lourdes Gallardo-Guerrero, Detection of the color adulteration of green table olives with copper chlorophyllin complexes (E-141ii colorant), LWT—Food Science and Technology, vol. 46, Issue 1, Apr. 2012, p. 311-318.*

* cited by examiner

*Primary Examiner* — Michele L Jacobson
(74) *Attorney, Agent, or Firm* — Carter, DeLuca, Farrell & Schmidt, LLP

(57) ABSTRACT

A process for coloring treated and untreated green olives by using chlorophyll, chlorophyllin, and copper chlorophyllin salts is presented. The process includes soaking salt out of the green olives in sodium chloride of density from about 0% to about 7%. The process also includes sinking the green olives into a first fluid solution holding sodium hydroxide and other metal hydroxyl groups from about 0% to about 3.5%, chlorophyll chlorophyllin salts and copper chlorophyllin salts, in a ratio of olive liquid from about 0.45 to about 4. The process then includes leaving the green olives in the first fluid solution from about 1 hours to about 72 hours, removing the green olives from the first fluid solution, washing the green olives with water, and sinking the green olives into a second fluid solution holding an acid until a PH of the green olives becomes less than about 4.6.

15 Claims, No Drawings

GREEN COLORING OF TABLE OLIVES WITH CHLOROPHYLL COMPOUNDS

CROSS REFERENCE TO RELATED APPLICATIONS

This application is a US national stage patent application claiming priority under PCT Article 22(1) to a patent application entitled "GREEN COLORING OF TABLE OLIVES WITH CHLOROPHYLL COMPOUNDS" having International Application Number PCT/GR2011/000030 filed on Aug. 11, 2010 and International Publication Number WO 2012/020269 A1 published on Aug. 1, 2011, the contents of the PCT application and the GR application are hereby incorporated by reference in their entirety.

BACKGROUND

1. Technical Field

The present disclosure is directed to a procedure for coloring green olives, treated or untreated that are whole olives, pitted and olive pieces, using alkaline water solutions of Chlorophyll, Chlorophyllin and Copper Chlorophyllin salts.

2. Relevant Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Therefore, unless otherwise indicated herein, what is described in this section is not prior art to the description and claims in this application and is not admitted to be prior art by inclusion in this section.

It is known that the natural extracts of Chlorophyll, Chlorophyllin and Copper Chlorophyllin salts are used for the manufacture of sweets, ice-creams and conserved vegetables without any adverse impact on health and are allowed to be used by the European Union (directive 20008/128EK 22-12-2008) and by the Federal Drugs and Foods Administration service of the United States of America (Federal Register Final Rule 67 FR 35429-May. 20, 2002).

The treated and un-treated green olives, during the treatment to remove the bitter taste, to be fermented in a solution of sodium chloride and during the preservation in tank with brine in presence of organic acids that adjust the pH, they lose most of the Chlorophyll amount they contained and acquire a yellow, light yellow-green and sometimes a yellow-brown color.

Through this method the whole olives, the pitted olives, the stuffed olives and the olive bits acquire a uniformed green natural color.

SUMMARY

The purpose of this disclosure is to attach or create a uniformed bright green color to treated and untreated, whole olives, pitted olives, olive rounds, in quarters and halves. In one exemplary embodiment, this is achieved by sinking or depositing the green olives in an alkaline environment with water solution of natural Chlorophyll, Chlorophyllin and Copper Chlorophyllin salts.

DETAILED DESCRIPTION

In the process of the present disclosure the whole, the pitted olives or olive pieces are sunk, according to each case, into a water solution which contains Sodium Hydroxide (and/or other metal hydroxyl groups) in density from about 0% to about 3.5%, depending on the maturity and the fermentation degree of the olives, adding natural Chlorophyll, Chlorophyllin and Copper Chlorophyllin salts in a density from about 0.002% to about 0.9%. They remain therein from about 1 hour to about 72 hours (and preferably between 5 hours and 36 hours), subsequently washed with water and then new water is added which contains Citric acid from about 0.1% to about 0.9% and Ascorbic acid from about 0.1% to about 0.3%. They remain there until the remainder of Sodium Hydroxide is neutralized. The last procedure is repeated until the pH of the system is balanced to a pH of less than about 4.6.

The product is ready to be preserved into glass, plastic or tinplated containers with filling fluid of Sodium Chloride ranging from 0.0-7% depending on the consumers' wish and adjusting of the filling fluid pH with organic acids in a number less than 4.6. The firmly closed containers are led to the heating treatment or neutral gas, as any other kind of packing according to the good manufacturing process.

The product, the whole olives, pitted olives or olive pieces can be preserved into containers not firmly closed, adding brine containing salt more than 4% in the presence of organic acids of Citric, Ascorbic and Lactic acid so as to obtain a pH less than 4.5. The presence of the preservative Sorbate Potassium within the permitted limits by the law up to 0.1% is wanted.

The examples following below are given with a view to the further explanation of the present invention. It must be taken into consideration that the parts mentioned in the following examples mean weight parts and the maturity of the raw material is in the middle of the harvest period.

In summary, a process for coloring treated and untreated green olives and their products by the use of water solutions of natural Chlorophyll, Chlorophyllin and Copper Chlorophyllin salts is presented. A procedure is presented for the coloring of green treated and untreated whole olives in, olives without the pit and olive slices by the use of alkaline solution of natural Chlorophyll, Chlorophyllin and Copper Chlorophyllin salts so as to have a product which is a uniformed bright green in color, enriched with Chlorophylls which were removed from the natural olives during the stages of their treatment, fermentation and storage in the tanks. It is a stable product, absolutely natural, which one can easily handle, after this exemplary process presented herein is performed, as all the other olives up until now, in the global market.

While the present disclosure has been illustrated with respect to several specific embodiments thereof, these embodiments should be considered as illustrative rather than limiting. Various modifications and additions may be made and will be apparent to those skilled in the art.

EXAMPLE 1

Five hundred grams of whole treated olives mid harvest period, undergone full fermentation, remaining sugars less than 0.04%, are set into 480 grams of water containing 15 grams of Sodium Hydroxide and 0.9 grams of Copper Chlorophyllin remain for 7-12 hours depending on the environment temperature. The solution is removed and the olives are washed for their clearing from the alkaline residues and the redundant Chlorophyllin. The olives are set into 520 grams of water which holds 0, 6 grams of Ascorbic acid and 1 gram of Citric acid. They remain there until the pH is balanced in a number less than 4.6. If this is not achieved, the solution is removed and a new identical solution is used. A third effort may be needed. It depends on the way the olives are washed. The ready olives are preserved in a jar with filling fluid of Sodium Chloride solution 3% and Citric acid for the adjusting of the pH solution in a number less than 4.2. The jar, then, is pasteurized in the temperature of 75° C. for 8-25 minutes and then immediately it is cooled in ambient temperature.

EXAMPLE 2

Four hundred and twenty grams of treated olives without a pit, mid period harvested and undergone a full fermentation, remaining sugars less than 0.04%,are set in 480 grams of water holding 13 grams of Sodium Hydroxide and 0.9 grams of Copper Chlorophyllin. They remain there for 7-10 hours, depending on the ambient temperature. Then, the solution is removed and the olives are washed for the clearing from the alkaline residues and the redundant Chlorophyllin. They are set in 520 grams of water which holds 0.6 grams of Ascorbic acid and 1 gram of Citric acid. They remain there until the pH is balanced in a number less than 4.6. If this is not achieved, the solution is removed and a new identical solution is used. A third effort may be needed. It depends on the way the olives are washed. The ready olives are set in 520 grams of brine which holds 10% Sodium Chloride, 0.1% Sorbate Potassium and 0.8% Lactic acid, in a jar with screw top.

The invention claimed is:
1. A process for coloring treated green olives by using chlorophyllin salts, the process comprising:
   soaking salt out of the treated green olives in sodium chloride;
   sinking the green olives into an alkaline first fluid solution including sodium hydroxide or other metal hydroxyl groups, and chlorophyllin salts;
   leaving the green olives in the first fluid solution from about 1 to about 72 hours;
   removing the green olives from the first fluid solution;
   washing the green olives with water;
   sinking the green olives into an acidic second fluid solution holding an acid; and
   maintaining the green olives in the second fluid solution until a pH of the green olives becomes less than about 4.2, wherein the aforementioned steps are performed at ambient temperature.
2. The process according to claim 1, wherein preservation of the green olives is obtained through pasteurization and preservation in a brine solution with food additives.
3. The process according to claim 2, wherein the green olives are set in closed containers with filling fluid including sodium chloride and additional acid, such that the PH of the green olives is maintained at less than 4.2.
4. The process according to claim 3, wherein the closed containers are pasteurized in temperatures from about 68° C. to about 80° C. for a period from about 25 minutes to about 30 minutes and subsequently cooled in ambient temperature.
5. The process according to claim 1, wherein the acid is at least one of lactic acid, citric acid, ascorbic acid, and hydrochloric acid or any combination thereof.
6. The process according to claim 1, wherein the green olives are pitted treated green olives.
7. The process according to claim 1, wherein the green olives are pieces of treated green olives produced from green treated pitted olives.
8. The process according to claim 7, wherein the pieces of treated green olives are in the form of a slice, half pitted olive or quarter pitted olive.
9. The process according to claim 1, wherein the second fluid solution is periodically changed to achieve the pH of less than about 4.2.
10. A process for creating a bright green color for treated green olives, the process comprising:
    depositing the treated green olives in an alkaline environment with a water solution of chlorophyllin salts;
    leaving the green olives in the water solution for a predetermined period of time;
    removing the green olives from the water solution;
    washing the green olives with water;
    depositing the green olives into an acidic solution holding an acid; and
    maintaining the green olives in the acid until a pH of the green olives becomes less than about 4.2, wherein the aforementioned steps are performed at ambient temperature.
11. The process according to claim 10, wherein the green olives are one of whole olives, pitted olives, olive rounds, olive halves, and olive quarters or any combination thereof.
12. A process for creating a bright green color for treated green olives, the process comprising:
    depositing the treated green olives in an alkaline environment with a solution of chlorophyllin salts;
    leaving the green olives in the solution for a predetermined period of time;
    removing the green olives from the solution;
    washing the green olives;
    depositing the green olives into an acidic solution having an acid; and
    maintaining the green olives in the acid until a pH of the green olives becomes less than about 4.2, wherein the aforementioned steps are performed at ambient temperature.
13. The process according to claim 12, wherein preservation of the green olive is obtained through pasteurization and preservation in a brine solution with food additives.
14. The process according to claim 12, wherein the green olive is a pitted treated green olive.
15. The process according to claim 12, wherein the solution is periodically changed to achieve the pH of less than about 4.2.

* * * * *